(12) United States Patent
Fujimoto et al.

(10) Patent No.: US 6,785,208 B1
(45) Date of Patent: Aug. 31, 2004

(54) REPRODUCER FOR DISC-SHAPE STORAGE MEDIUM

(75) Inventors: Hitoshi Fujimoto, Ehime (JP); Yoshiharu Kajinami, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/937,768

(22) PCT Filed: Mar. 29, 2000

(86) PCT No.: PCT/JP00/01926

§ 371 (c)(1),
(2), (4) Date: Jan. 3, 2002

(87) PCT Pub. No.: WO00/60588

PCT Pub. Date: Oct. 12, 2000

(30) Foreign Application Priority Data

Apr. 1, 1999 (JP) .............................. 11/94690

(51) Int. Cl.[7] .............................................. G11B 3/90
(52) U.S. Cl. .................................. 369/53.18; 369/53.14
(58) Field of Search ........................... 369/47.38, 47.39, 369/47.44, 53.12, 53.13, 53.14, 53.18, 53.2, 53.22, 53.37, 53.42, 53.45

(56) References Cited

U.S. PATENT DOCUMENTS 6,256,275 B1 * 7/2001 Eguchi et al. ........... 369/44.32
6,304,528 B1 * 10/2001 Kanda et al. ............ 369/44.28
6,370,094 B1 * 4/2002 Kishinami et al. ....... 369/44.32

FOREIGN PATENT DOCUMENTS

| JP | 10-074357 | 3/1998 |
| JP | 10-083615 | 3/1998 |
| JP | 10-241282 | 9/1998 |
| JP | 11-053829 | 2/1999 |
| JP | 11-328828 | 11/1999 |

* cited by examiner

Primary Examiner—Paul W. Huber
(74) Attorney, Agent, or Firm—McDermott Will & Emery LLP

(57) ABSTRACT

A reproducer provided with a vibration value measuring means which has functions of, prior to data reproducing, detecting vibration of, and determining vibration value for, a disc, and which measures a vibration value obtained when the disc with a known mass eccentricity is mounted on the reproducer and is rotated, characterized in that values relating to the measured vibration value are stored in a storage in the reproducer as threshold values indicating allowable limits of the vibration value, thereby preventing unstable vibration detection due to differences between individually manufactured reproducers when a disc with a large mass eccentricity is reproduced at high speed, and permitting a reproducing operation that will not give a user an unpleasant feeling.

20 Claims, 9 Drawing Sheets

REPRODUCER FOR DISC-SHAPE STORAGE MEDIUM

This application is a 371 of PCT/JP00/01926, filed Mar. 29, 2000.

TECHNICAL FIELD OF THE INVENTION

The present invention relates to a device for reproducing data from a CD-ROM or like storage medium.

BACKGROUND OF THE TECHNOLOGY

As is disclosed in Japanese Laid-Open Patent No. Hei 10-83615, for example, data is generally read out by first measuring vibration value by rotating a disc at a maximum speed prior to reproducing data and, when the vibration value is beyond a predetermined threshold level, by rotating the disc at a speed lower than the maximum speed. A CD-ROM is a CD (compact disc) used as a ROM (read-only memory) and is used in computer systems just like a semiconductor ROM. As high speed processing is required in computer systems, rotational speed of a CD-ROM is generally set at a speed several to several tens of times higher than the rotational speed (200 rpm) of audio CD's.

When a CD-ROM is scanned by a disc reproducer at such a high speed as 40 times the standard scanning speed, for example, an error of a tracking control system for correcting eccentricity of track due to disc vibration increases thus resulting in an error in reading-out data on the disc and requiring a retrial thereby lowering performance of reproduction. Also, when a low-quality disc having a large mass eccentricity is rotated, not only the disc but also the entire disc reproducer vibrates, and the vibration affects a hard disc drive (HDD) installed in a housing of a computer system together with the disc reproducer. There is thus a possibility of causing read/write error in the HDD, which lowers reliability of the entire computer system. Also, even if an error may not be generated in reading/writing of the HDD, vibration of the disc reproducer gives an unpleasant feeling to a user. The above problem can be solved by either reducing mass eccentricity of the CD-ROM or lowering the rotational speed. However, in practice, there is a large dispersion in the quality of CD-ROM's and some discs are inappropriate for reproduction at a high speed.

In order to solve this problem, vibration value of a disc reproducer is detected and, when the detected value is beyond a preset threshold level, the reproducer is operated at a reduced disc rotational speed. However, as the detected vibration value varies due to manufacturing dispersion of individual disc reproducers, in a conventional fixed threshold level design, there has been a problem of inability to precisely switching the disc rotational speed.

DISCLOSURE OF THE INVENTION

It is an object of the present invention to provide a disc reproduction method and device that can stably reproduce data at as high speed as possible for both a high-quality storage medium disc and low-quality storage medium disc. Also, the present invention employs a method of detecting the maximum data reproducible speed by performing vibration detection from the side of a lower disc speed in order not to give an unpleasant feeling to a user by generating large vibration even during a vibration detecting mode.

In order to achieve the above object, the data reproducer in accordance with the present invention comprises the following: namely, disc rotating means structured in a manner such that a storage medium disc having data recorded on a spiral or concentric track and a center hole can be detachably fit to a spindle of the reproducer, a signal converter for reading out the data from the disc, and moving means for moving the signal converter in the radial direction of the disc.

Next, an allowable-limit vibration value is set in an adjusting process of individual data reproducer manufacture, and a plurality of allowable-limit mass eccentricity discs (hereinafter referred to as "standard vibrating discs") with a known mass eccentricity is prepared of which the vibration values at the maximum data reproduction speed and lower data reproduction speeds are equivalent to the allowable-limit vibration value. Each of the discs is then mounted and the difference (P—P value) between the peak value in the positive direction of a tracking servo error signal (TE signal) and the peak value in the negative direction as obtained by rotating at a predetermined reproduction speed is detected as the vibration value of the disc reproducer in question, and the vibration value is set as the threshold level for the combination of the data reproduction speed and the vibration-limit disc as described later. When a disc with an unknown mass eccentricity is mounted, vibration value is detected at a data reproduction speed on the lower speed side that is lower than the maximum reproduction speed (hereinafter simply referred to as "the low speed side", the opposite side being referred to as "the high speed side"), followed by a first step of measuring a voltage (hereinafter referred to as "vibration value") proportional to the disc vibration that is occurring and a second step of judging whether or not the vibration value is below the threshold level. When it is judged in the second step that the vibration value is below the threshold level, the disc is rotated at the above-mentioned reproduction speed by the disc rotating means, and the signal converter reads out the data from the disc. When it is judged that the mass eccentricity is not within the allowable range, the disc is rotated by the disc rotating means at a data reproduction speed lower than the vibration detecting speed so that the afore-mentioned data can be read out from the disc with the signal converter.

In other words, a plurality of vibration detecting speeds (which may be the same as the data reproduction speed) is set at the maximum data reproduction speed and at speeds lower than that, and an allowable-limit mass eccentricity disc (standard vibrating disc) is prepared for each of the detecting speeds. The first threshold level for the first vibration detecting speed is set at the vibration value as detected on an allowable-limit mass eccentricity disc Da at a first vibration detecting speed. When a disc D with an unknown mass eccentricity is mounted, if the detected vibration data at the first vibration detecting speed is within the range of the first threshold level, vibration detection is carried out at a second vibration detecting speed that is higher than the first vibration detecting speed.

The second threshold level for the second detection speed is set at the vibration data as detected on an allowable-limit vibrating disc Db at a second speed. When the detected vibration data at the second vibration detecting speed of the disc D with an unknown mass eccentricity is within the range of the second threshold level, vibration detection at a third vibration detecting speed is carried out. In this way, vibration detection is carried out in sequence from the low-speed side toward the high-speed side. At the stage a detected vibration data is found to be outside of respective threshold level range, the data is read out with a vibration detecting speed lower than the vibration detecting speed at which the detected vibration value was outside of respective threshold level range as the maximum speed. A data reproducer having such data reading means is hereby proposed.

According to a reproducer having the above structure, an allowable mass eccentricity of a disc is precisely set as a threshold level (allowable range) for each individual disc reproducer at the time the disc is reproduced at the maximum rotational speed at which data is reproducible. Consequently, by changing the maximum speed at which data can be reproduced depending on the mass eccentricity, it becomes possible to carry out high-speed reproduction of a disc that has a small mass eccentricity at the maximum speed available with the data reproducer, and to carry out reproduction of a disc having a large mass eccentricity under a condition in which a problem associated with mass eccentricity will not occur.

Also, according to the present invention, as high-speed rotation of a low-quality disc can be prevented, vibration value of a disc or data reproducer is limited. As a result, ripple effect of vibration on a separate device (HDD, for example) contained in the same housing as that of a data reproducer according to the present invention can be limited, thus enabling normal operation of the separate device (HDD, for example). Also, as vibration of the disc or data reproducer is limited, unpleasant feeling to a user will be reduced.

Furthermore, in the present invention, as the maximum reproduction speed that is available within the allowable limit of the vibration value is determined by carrying out vibration detection two or more times from the low speed side of the disc rotation toward the high speed side, unpleasant feeling to the user can be prevented in the vibration detecting mode, too.

DESCRIPTION OF THE PREFERRED EMBODIMENTS

Figure 1:
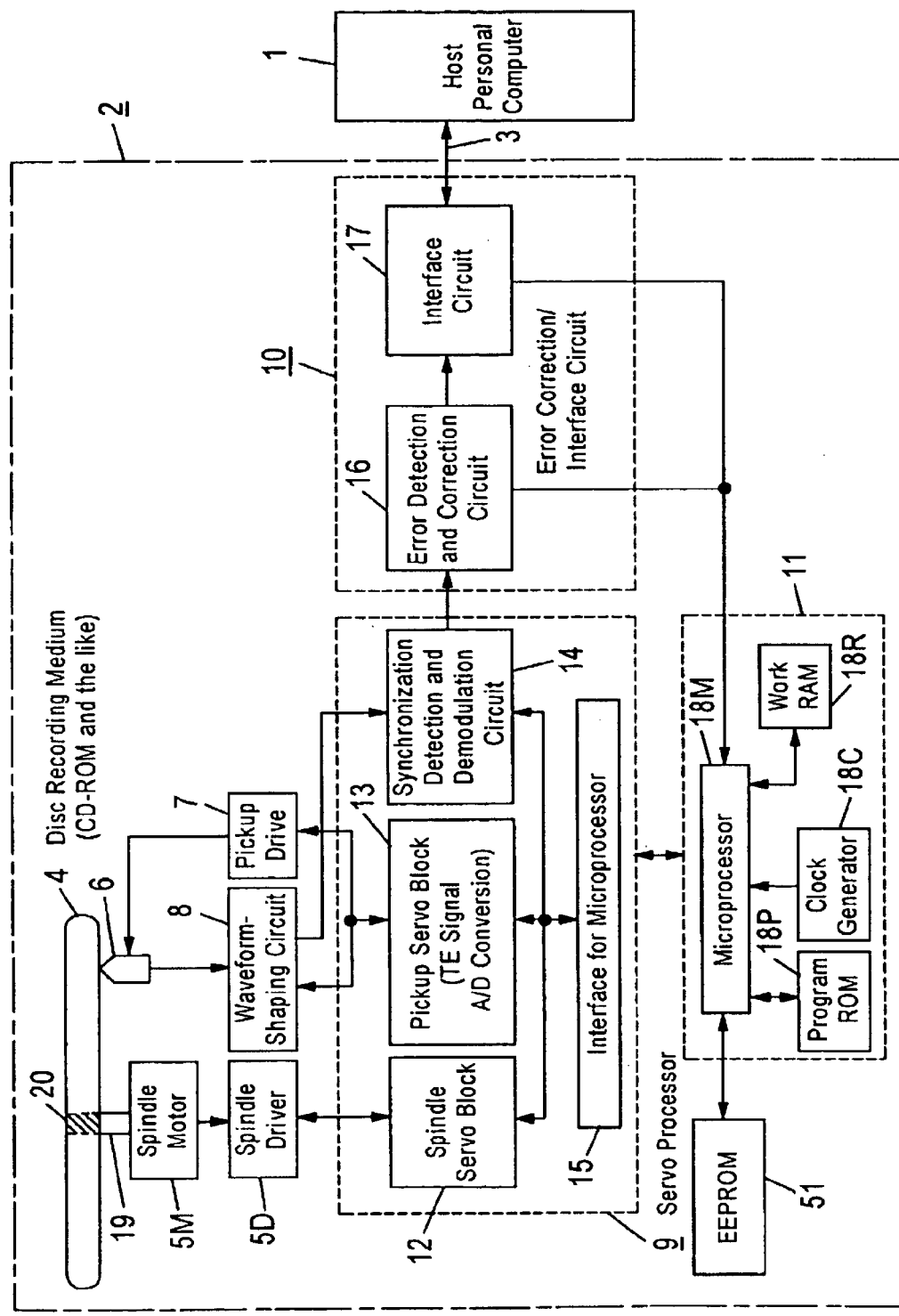
FIG. 1 is a block diagram of a disc-shape storage medium (e.g., CD-ROM) drive in an exemplary embodiment of the present invention.

A description of a disc reproducer will be given in reference to FIGS. 1 to 7 as an exemplary embodiment of the present invention. FIG. 1 shows host computer 1 and disc reproducer 2. Disc reproducer 2 functions as a source of data supply to host computer 1, and they are connected with bus 3.

Disc reproducer 2 comprises optical storage medium disc (CD-ROM) 4 comprising a CD, disc-rotating spindle motor 5M and spindle drive 5D of the spindle motor both being part of disc rotating means, optical pickup 6 as a signal converter, pickup drive 7 having a function as means for positioning or moving optical pickup 6, waveform-shaping circuit 8 for amplifying and shaping signal picked up by optical pickup 6, servo processor 9 for moving and focusing pickup 6 and for controlling synchronous rotation of motor 5M, signal processor block 10, system control block 11, and EEPROM 51 for storing threshold level.

Servo processor 9 comprises spindle servo block 12 as rotation control means for disc 4, servo block 13 of drive block 7 of tracking servo, focus servo, and pickup 6, synchronization detection and demodulating circuit 14, and interface 15 for a microprocessor for interfacing with system control block 11. Signal processing block 10 comprises error detection and correction circuit 16 and interface circuit 17.

System control block 11 comprises microprocessor 18M, program ROM 18P for storing executive instruction and the like for microprocessor 18M, work RAM 18R for microprocessor 18M, and clock generator 18C.

Figure 2:
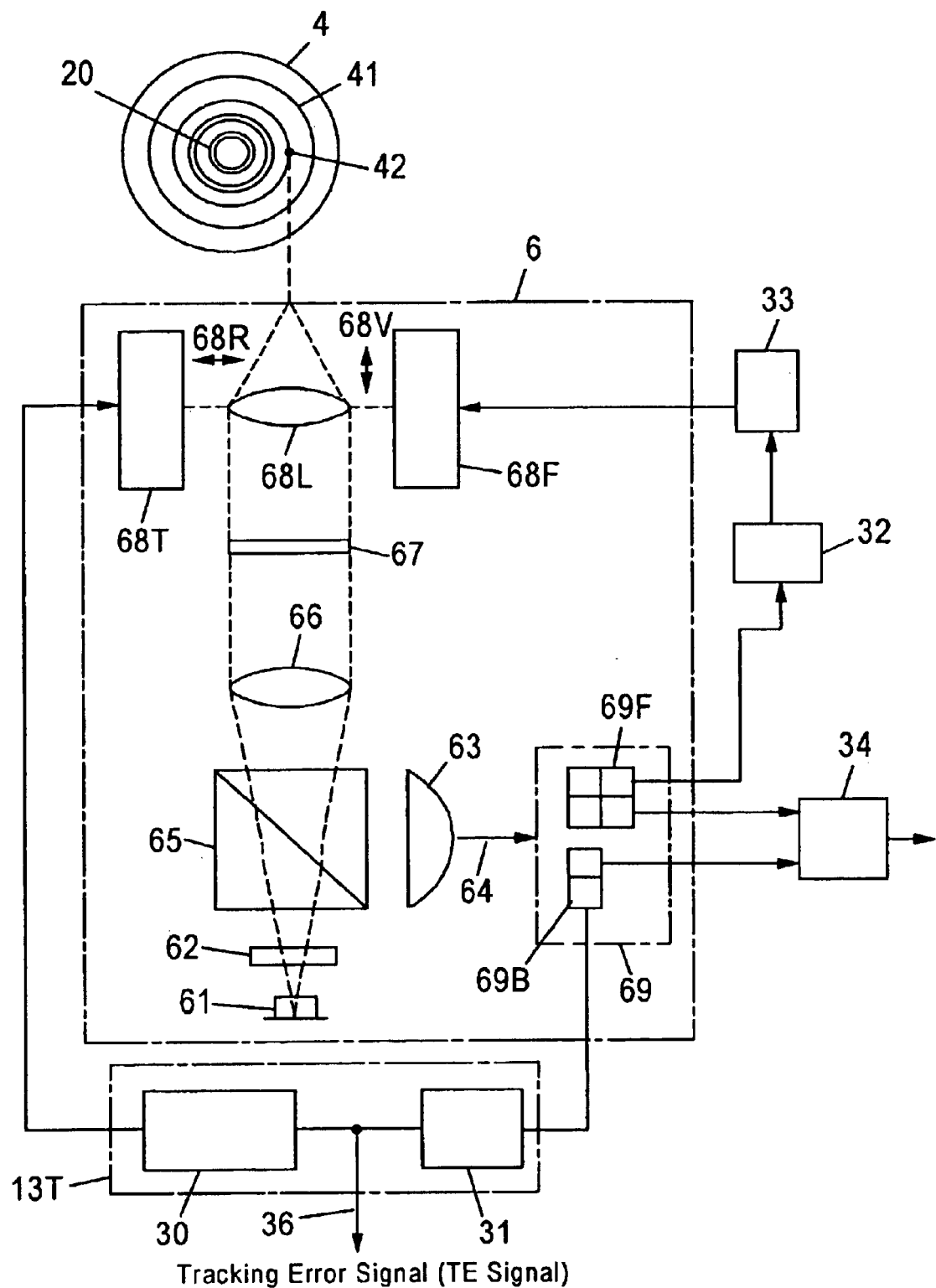
FIG. 2 is a block diagram showing disc, optical pickup, tracking servo circuit, focus servo circuit, and read-out output circuit in FIG. 1.

Disc (CD-ROM) 4 has center hole 20 to which spindle 19 coupled with motor 5M is to be inserted, and has spiral track 41 that runs from the inner side of the disc toward the outer side with center hole 20 at the center as illustrated in FIG. 2. Data is recorded on track 41 as optical pits of a number of data blocks in the known format, where 2352 bytes constitute 1 unit or 1 data block, 1 byte being 8 bits. One data block is reproduced in $1/75$ second when reproduced at a standard speed that is the same as the scanning speed (1.2 to 1.4 m/sec) of an audio CD. As is well known, CD-ROM data is reproduced at a constant angular velocity (CAV).

As schematically shown in FIG. 2, optical pickup 6 is a known unit comprising, for example, laser source 61 comprising a laser diode, diffraction grating 62, beam splitter 64, collimater lens 66 for obtaining a parallel light beam, quarter-wavelength plate 67, objective lens 68L, cylindrical lens (a lens looking like a part of a cylinder) disposed on the optical path of a reflected light beam, optical detector 69 (consisting of 69F and 69B), actuator 68T for tracking control, and actuator 68F for focus control.

In optical pickup 6, focus actuator 68F is driven by a control signal from focus servo block (focus error detecting circuit 32, phase compensation and drive circuit 33) that constitutes pickup servo block 13, and a light beam emitted by light source 61 is focused with objective lens 68 and projected to the main surface of disc 4, and the data stored on disc 4 in the form of optical pits is read out. As the optical pits are disposed on track 41 in a manner corresponding to the data, when a non-modulated light beam is projected onto disc 4 as a reproducing beam, the reproducing beam is modulated by the pits (data) and reflected light beam 64 incident on optical detector 69 becomes a modulated beam. Optical detectors 69F, 69B are optical detecting means for converting light into electric signals.

The tracking servo circuit and focus servo circuit that constitute pickup servo block 13 are publicly known as disclosed in Japanese Laid-Open Patent Application No. Hei-83615, for example.

The vibration of a disc reproducer due to mass eccentricity of disc 4 as referred to in the present invention takes place in principle in the radial direction of the disc, where the magnitude is proportional to the product of the amount of mass eccentricity and square of rotational speed of the disc, and its main component is one that is periodically produced in each rotation of the disc.

In FIG. 2, tracking servo circuit 13T that constitutes pickup servo block 13 detects radial displacement (in a direction crossing the track) of light beam spot 42 on track 41 as a TE signal with tracking-error detecting circuit 31. Subsequently, negative feedback control is carried out with phase compensation and drive circuit 30 to drive objective lens 68L in the radial direction of the disc (direction crossing the track) by means of tracking actuator 68T, namely, in the direction of arrow 68L, thus enabling tracing of the track.

Consequently, the TE signal contains vibration information even in the vibration data read-out mode.

Also, waveform-shaping circuit 8 demodulates EFM (Eight-to-Fourteen Modulation) signals into NRZ digital signals, for example, by using a sync signal obtained by connecting to sync detection and demodulation circuit 14, and supplies them to servo processor 9.

Well-known error detection and correction circuit 16 connected to sync detection and demodulation circuit 14 detects error in the demodulated data (reproduced data) and makes correction when error is detected and is correctable. Error detection and correction circuit 16 is connected to interface circuit 17 and system control block 11. In the event an uncorrectable data reproduction error has occurred, retrial is carried out in a well-known manner. In the meantime, waveform-shaping circuit 8, sync detection and demodulation circuit 14, and error detection and correction circuit 16 can be collectively called reproduction signal processing means.

Also, interface circuit 17 is connected between error detection and correction circuit 16 and host computer 1 as well as between host computer 1 and system control block 11.

Though not shown in FIG. 1, a frequency signal generator (hereinafter FG) is coupled to motor 5M and generates pulses at a frequency corresponding to the rotation of motor 5M. FG is connected to system control block 11 and to spindle servo block 8 that executes CAV control. The output pulses of FG are not only used for CAV control but also for setting time required for detection of vibration value of disc 4. Consequently, FG can be regarded as part of the vibration value detecting means. System control block 11 as reproduction control means comprises microprocessor 18M, program ROM 18P, and work RAM 18R, and operates according to an operation control program stored in program ROM 18P.

Figure 4:
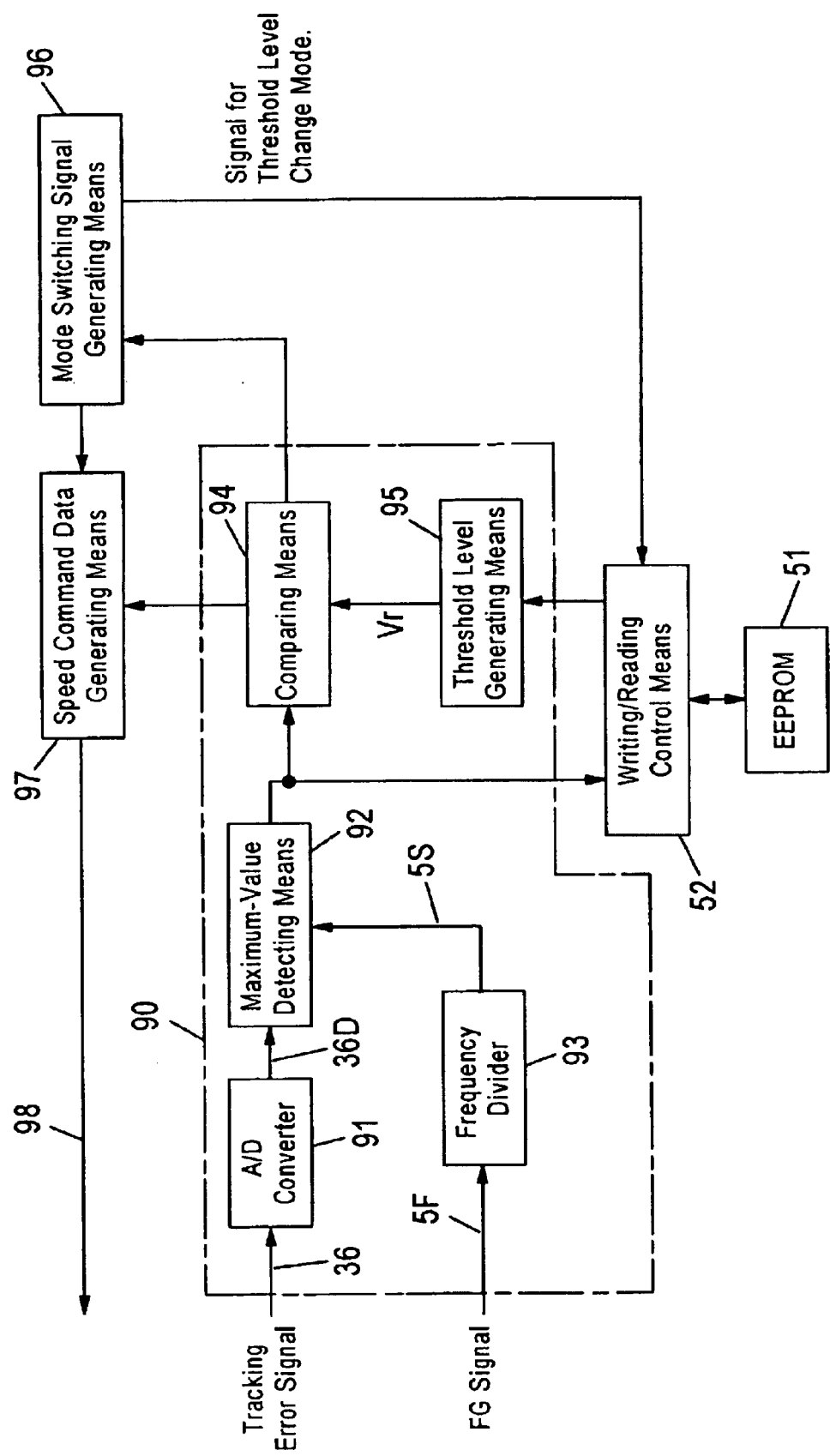
FIG. 4 is an equivalent block diagram that illustrates mass eccentricity measurement and disc speed setting means in system control block 11 in FIG. 1.

FIG. 4 is a block diagram illustrating a part of system control block 11 and servo processor 9 in FIG. 1 in an equivalent or functional manner. As is clear from FIG. 4, system control block 11 and servo processor 9 include mode switching signal generating means 96 and vibration value detecting and judging means 90 that further includes frequency divider 93, comparing means 94, A/D converter 91, maximum value detecting means 92, threshold-level generating means 95 and comparing means 94, and speed command data generating means 97 for commanding the rotational speed of motor 5M.

Mode switching signal generating means 96 generates vibration value detecting mode signal, normal reproduction mode signal, and threshold-level setting mode signal.

A/D converter 91 in FIG. 4 converts a TE signal voltage in pickup servo block 13 into a digital signal when in vibration detecting mode. Maximum value detecting means 92 detects maximum amplitude value (Peak-to-Peak value) of the TE signal within the time of one rotation of disc 4 based on signal 5S that indicates one rotational period of disc 4 as obtained by frequency division of FG pulse 5F with frequency divider 93 and TE signal 36D as obtained from A/D converter 91. Here, the vibration value of disc 4 can be known from the difference between the positive peak and negative peak of the TE signal, namely, the interval between the positive peak and negative peak. In other words, if there is no vibration of disc 4, it is not necessary to adjust tracking of light spot 42 based on vibration, and the voltage of the TE signal is in the vicinity of zero volt under normal servo condition. On the other hand, when there is vibration due to mass eccentricity of a disc, the position of the objective lens in the radial direction of disc 4 changes greatly, and the voltage of the TE signal changes toward positive or negative direction in order to make correction. Accordingly, it becomes possible to measure vibration as eccentricity of a track in terms of the TE signal. In this exemplary embodiment, vibration is detected based on the sum of the maximum value of the positive peak and the maximum value of the negative peak of the TE signal voltage during one rotation of disc 4, namely, the amount of amplitude change from the maximum value of the positive peak to the maximum value of the negative peak. Threshold-level generating means 95 sends out to first judging means, namely, comparing means 94 a signal, namely, threshold level Vr that indicates allowable limit of vibration when disc 4 is rotated at the maximum speed. The threshold level Vr is a criterion value pre-stored in EEPROM 51, which is read out from EEPROM 51 by writing/reading (hereinafter R/W) control means 52, and is sent to comparing means 94 through threshold-level generating means 95. Comparing means 94 makes judgment as to whether or not the maximum value of the TE signal that indicates vibration value is below the criterion value, and sends the result to speed command data generating means 97. When the vibration value exceeds threshold level Vr, a low-quality disc flag is set and the disc rotational speed is lowered.

In FIG. 4, speed command data generating means 97 puts out at least two speed command data to line 98, namely, a maximum speed and a second speed lower than the maximum speed. When a maximum speed command is put out from speed command data generating means 97, spindle servo block 12 drives disc 4, and the focus servo circuit and tracking servo circuit are brought into operation. Under a state of data reproduction, signal 36D obtained by digitalizing TE signal 36 is put to maximum value detecting means 92. By obtaining periodic signal 5S for one rotation of a disc by frequency division of FG signal 5F, maximum amplitude value Vte during one rotation of the disc is obtained, comparison is made by comparing means 94 to determine whether or not Vte is within the allowable range, namely, less than the threshold level Vtr. When a "No" signal is obtained indicating that Vte>Vtr, an assumption is made that the disc is of low quality, rotational speed of disc 4 is lowered from the maximum speed to the second speed, and date reproduction is carried out.

When a "Yes" signal is obtained indicating that Vte<Vtr, an assumption is made that the disc is within the allowable range, and it is rotated at the maximum speed as it is, and data reproduction is carried out. As a result, the time required for data reproduction can be shortened.

In the above, a conceptual description is given on two cases of speed, namely, the maximum speed and a second speed lower than the maximum speed. It is an object of the present invention to minimize as much as possible the vibration that is unpleasant to a user even during the vibration detecting mode.

In other words, it is an object to find out a maximum speed for a disc with an unknown mass eccentricity at which secure data reproduction is possible at or below an allowable vibration value. That is, for a disc having a large vibration value, to detect the maximum speed at which data is reproducible on the low speed side where the vibration value is less than the allowable-limit vibration value of the reproducer, and, for a disc having a small vibration value, to detect the maximum speed at which data is reproducible on the high speed side.

This approach makes it possible to avoid reduction in performance of the reproducer due to a situation in which reproduction speed is set on the low speed side for a disc having a small vibration value.

Figure 8:
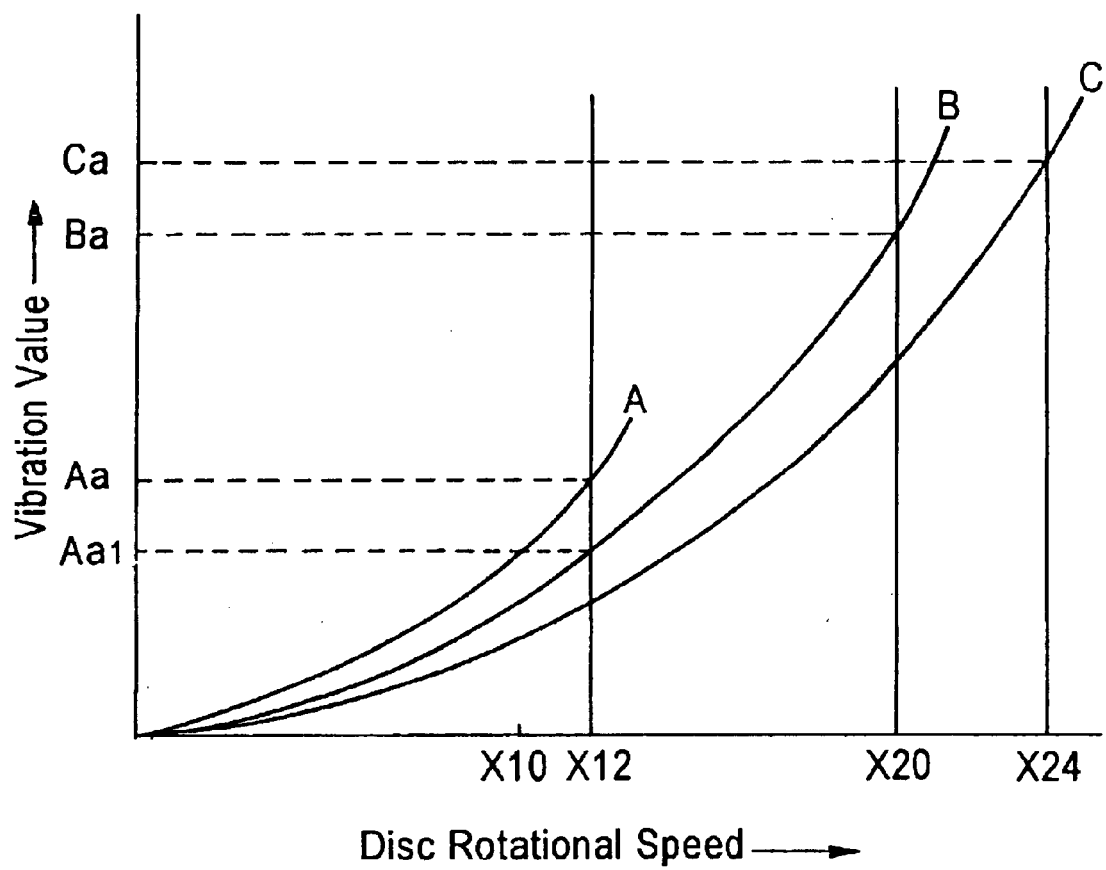
FIG. 8 is a graph showing relationship between disc rotational speed and vibration value.

A description of operation of an exemplary embodiment of the present invention will now be given in reference to FIG. 8. The abscissa of the graph of FIG. 8 represents disc rotational speed of a reproducer, which can be set in a manner such that data reproduction at ×10 (10 times), ×12, ×20, and ×24 the standard speed can be made. The speeds of ×12, ×20, and ×24 are also set as vibration detecting speeds. The ordinate represents vibration value and the values Aa, Ba, Ca on the ordinate axis represent respective vibration values of allowable-limit discs Da, Db, Dc at ×12, ×20, and ×24 speeds. As shown in FIG. 8, the vibration value increases in the order of Da, Db, Dc. These values are used as threshold levels at each respective speed. Curves A, B, C show speed vs. vibration value characteristic of discs Da, Db, Dc.

Next, a description will be given below on the method of finding the maximum speed for data reproduction by detecting vibration value of a disc with an unknown mass eccentricity. First, vibration value is detected at the moment the disc rotational speed has reached ×12 speed from a low speed. Supposing that the vibration value is detected to be V12, if V12>Aa, the disc is judged to be outside of the allowable limit. As a result, a minimum data reproduction speed (×10 speed in this case) can be set at which most of the vibration of disc reproducers will fall below the allowable limit when dispersion of mass eccentricity of discs on the market is taken into account. In the case of the figure, as ×10 speed is set as the minimum speed, the ×10 speed is set as the maximum speed at which data is reproducible.

If V12<Aa. data reproduction at ×12 speed is judged to be possible. Additionally, a command is issued to increase the disc rotational speed to ×20 speed and the vibration value at the moment the disc rotational speed has reached ×20 speed is detected as V20 in the same manner as before.

If V20>Ba, the disc is judged to be outside of the allowable limit and a speed change command is issued to lower the disc rotational speed to ×12 speed, thus making the ×12 speed the maximum speed at which data is reproducible.

Furthermore, if V20<Ba, judgment is made that data reproduction is possible at a further higher speed, and a command to increase the disc rotational speed to ×24 speed is issued. At the moment the disc rotational speed has reached ×24 speed, vibration detection is carried out and detected value V24 is obtained as the vibration value in the same manner as above.

If V24>Ca, the disc is judged to be outside of the allowable limit, a rotational speed change command is issued to lower the disc rotational speed to ×20 speed, and the ×20 speed is set as the maximum speed at which the disc is reproducible.

If V24>Ca, judgment is made that data reproduction at ×24 speed is possible and the ×24 speed is set as the maximum speed. By setting maximum speed of data reproduction in the manner described above, it becomes possible to set the maximum speed at which data is reproducible without allowing vibration that exceeds the allowable vibration limit to take place on the high-speed side independently of the magnitude of disc vibration values.

In other words, data reproduction on the high-speed side is enabled as surely as possible even for a disc with a small mass eccentricity, and previously mentioned functional reduction can be prevented.

Also, instead of making judgment by successively increasing the vibration detecting speed from the low-speed side as described above, vibration value Aa1 in FIG. 8 of an allowable-limit disc is chosen as a threshold level at 12× speed. If a vibration value V12 of a disc with a known vibration value as obtained by reproducing at ×12 speed satisfies V12<Aa1, it can be assumed that the vibration value is below the allowable limit at a maximum speed of ×24, and the ×24 speed is judged to be the maximum reproduction speed. If Aa1<V12<As is satisfied, ×20 speed is judged to be the maximum reproduction speed while, when V12<As is satisfied, ×10 speed is judged to be the maximum speed. If the sensitivity of vibration detection is high enough, one-time vibration detection will suffice indicating that it is simpler than a method of making judgment by successively increasing vibration detecting speed from the low speed side.

By setting threshold levels and making vibration value detection on the low speed side as has been described above, the present invention has advantages of not giving an unpleasant feeling to a user during vibration value detection and also avoiding the risk of possible damage of a computer system due to abnormal vibration that might be generated when carrying out vibration value detection on the high speed side from the beginning using a disc having a large vibration value.

In recent data reproducers, data reproduction speed has increased such as ×8, ×10, ×20, ×30, ×40 speeds, and there are many cases where data reproduction is carried out at respective speeds. In comparison to these data reproducers, the present invention provides a method in which a maximum reproduction speed applicable for a disc with an unknown vibration value can be determined in a stable and efficient manner.

Figure 3:
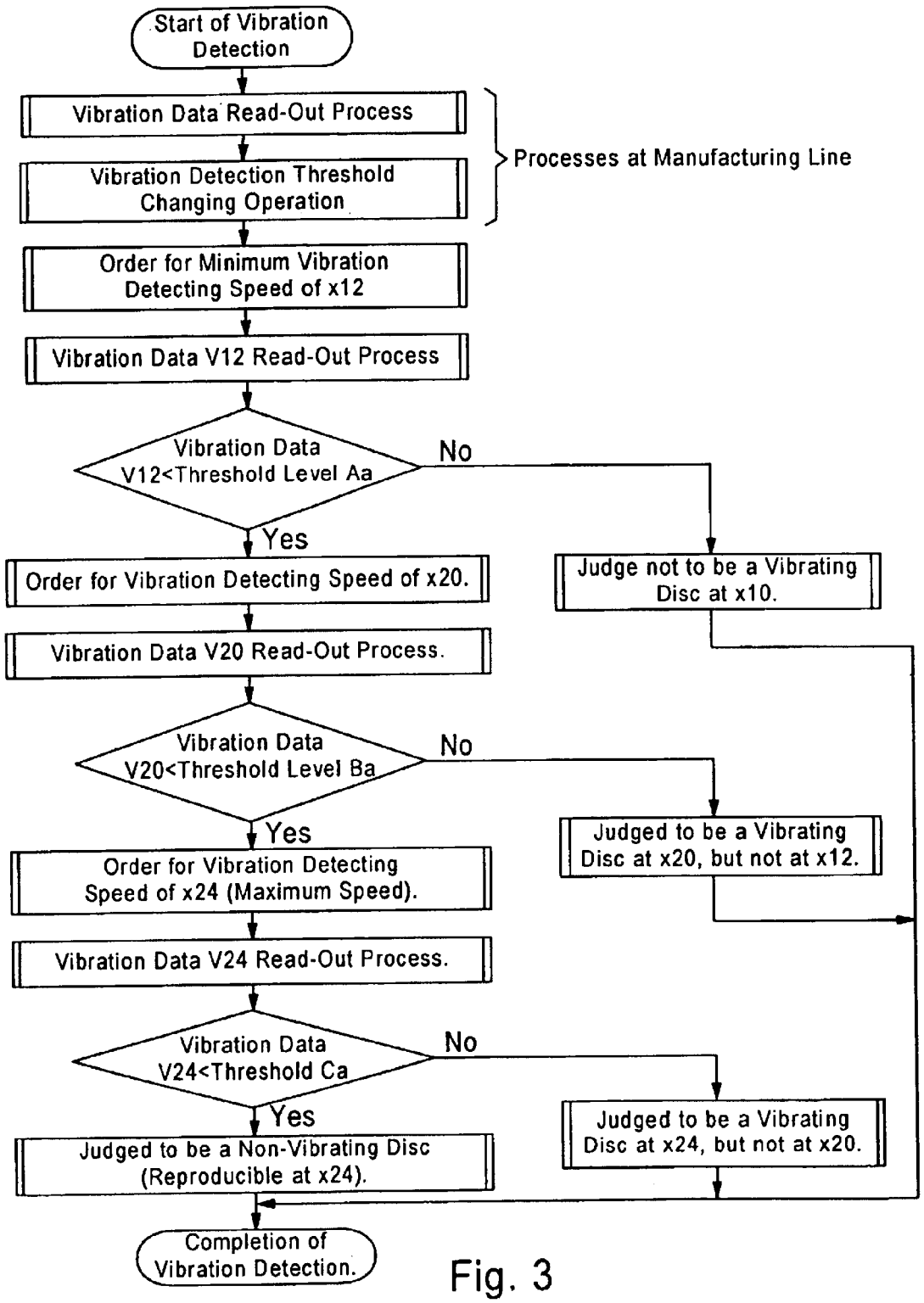
FIG. 3 is a flow chart for vibration detection.

A description of the above vibration detection operation will be given in reference to the flow chart of FIG. 3. In the flow chart of FIG. 3, vibration detection starts when a disc with an unknown vibration value has been mounted, namely, when disc 4 has started to rotate and optical pickup 6 has detected a signal. A command for ×12 speed at which the disc rotational speed is higher than the lowest data reproduction speed set in the disc reproducer is sent to speed command data generating means 97. At the moment ×12 speed is reached, vibration value data V12, namely TE signal (2-byte numeral), is input to microprocessor 18M of system control block 11 as an output of maximum value detecting means 92 as described earlier. Vibration value data V12 is then compared with a threshold level Aa (stored in EEPROM 51) to determine whether vibration value data V12 is greater or smaller. When vibration value data V12 is greater than the threshold level Aa, ×10 speed is judged to be the speed at which data is reproducible. If the vibration value data is smaller than the threshold level Aa, judgment is made that reproduction at a higher speed is possible, and a signal is sent to speed command data generating means 97 so as to increase the reproduction speed. In this case the command is for ×20 speed. In the same manner as above, vibration value data V20 at ×20 speed is compared with threshold level Ba. If vibration value data V20 is greater than the threshold level Ba, ×12 speed is judged to be the maximum speed at which data is reproducible. If vibration value data V20 is smaller than the threshold level Ba, judgment is made that reproduction at a still higher speed (in this case the maximum speed is assumed to be ×24 speed) is possible. Similarly, a command signal to increase the speed is sent to speed command data generating means 97, and vibration value data V24 obtained at the moment the disc has reached ×24 speed is compared with threshold level Ca. If vibration value data V24 is greater than threshold level Ca, judgment is made that the disc is a vibrating disc, and a signal to lower the reproduction speed is sent to speed command data generating means 97, and ×20 speed is judged to be the maximum speed at which data is reproducible. Also, while data reproduction at a further higher speed is possible if vibration value data V24 is smaller than threshold level Ca, vibration value detection is completed by judging that ×24 speed is the maximum speed at which data is reproducible because ×24 speed is the maximum speed in this case.

Figure 5:
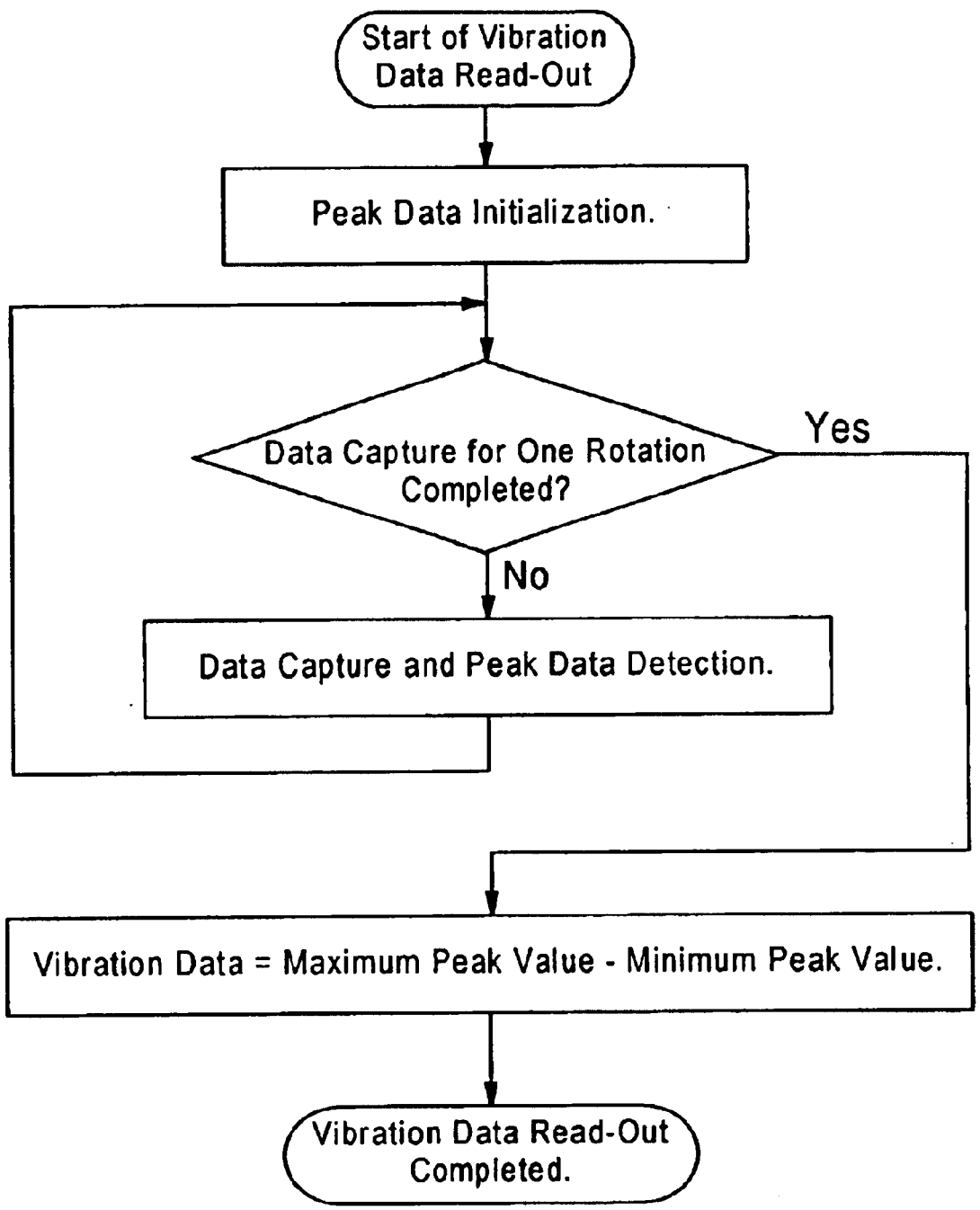
FIG. 5 is a flow chart for vibration data read-out process.

Next, a description will be given on vibration data read-out process in reference to FIG. 5. Upon start of vibration detection as described above, vibration data read-out routine will start in the first place, and initialization of peak data is carried out. This is done by storing positive or negative peak voltage of the TE voltage that appears during one rotation of a disc. Data capture during one rotation is done by successively sampling data from the first positive or negative peak voltage to the next positive or negative peak voltage at appropriate intervals, and sending the result from maximum value detecting means 94 in FIG. 4 to microprocessor 18M. Microprocessor 18M temporarily stores the TE signal voltage in work RAM 18R. After data of one rotation is stored in work RAM 18R, positive and negative peak voltages are read out and the values are stored as vibration data at a separate address within work RAM 18R.

Figure 6:
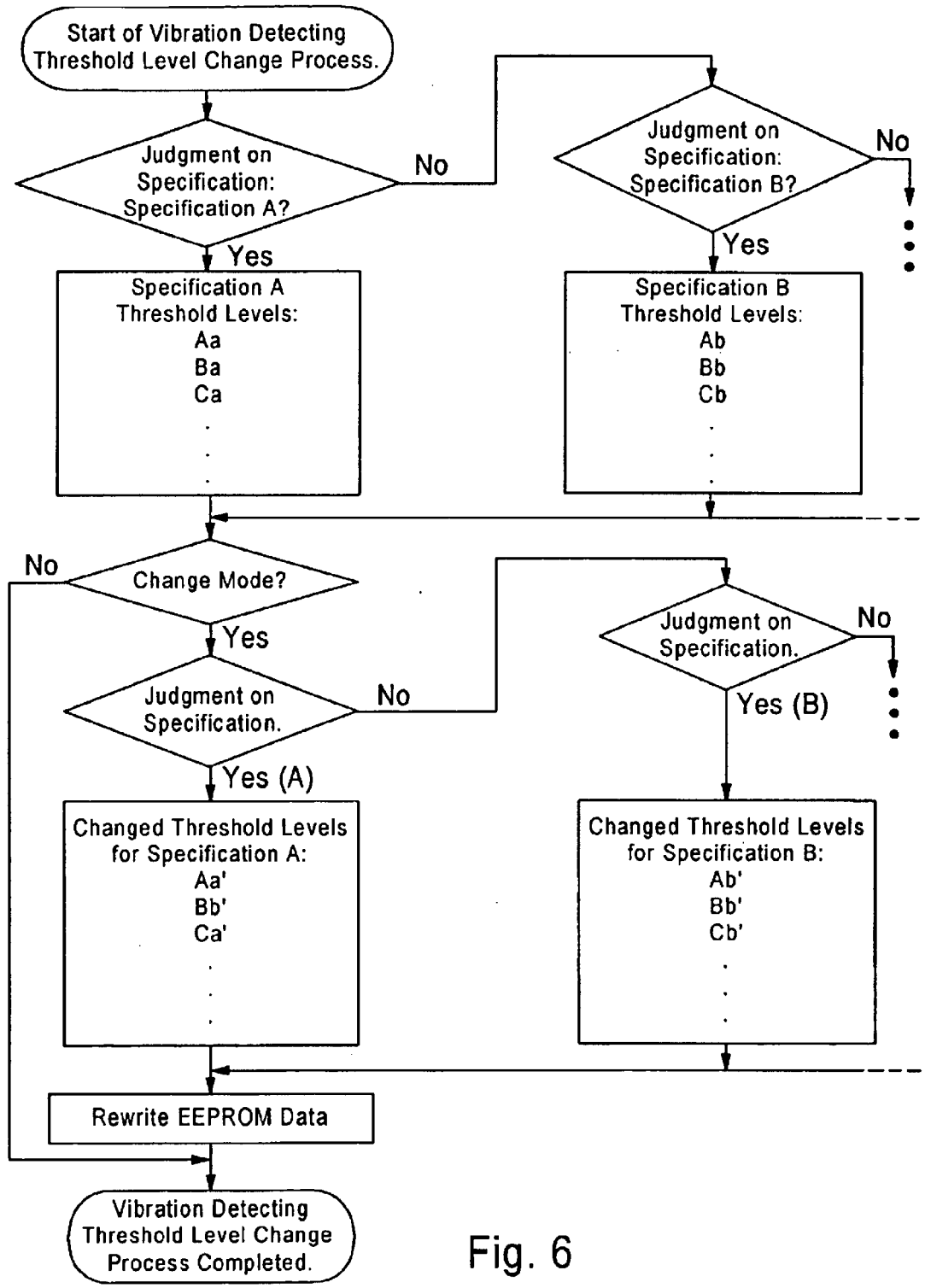
FIG. 6 is a flow chart for vibration threshold level changing process.

A description on threshold level change, being a key part of the present invention, will now be given below in reference to FIG. 6. In the present invention, it is common that allowable vibration value of a disc-shape storage medium (CD-ROM and the like) reproducer differs depending on the product system to which the disc-shape storage medium (CD-ROM and the like) reproducer is applied, such as a portable personal computer in which a key board, HDD unit, display and the like are encased as an integral unit, or a desktop personal computer in which individually encased separate units are connected with cables. Consequently, in the manufacturing process of a disc storage media (CD-ROM and the like), the allowable vibration value, namely, threshold level differs for each individual product system such as Specification A, Specification B, etc.

Therefore, a standard threshold level for each different specification is burnt into EEPROM 51 (FIGS. 1 and 4) in advance as a voltage value in the form of a 2-byte long numeral.

For example, supposing that the exemplary embodiment described above is Specification A, as parameters for Specification A as in the description in reference to FIG. 8, maximum values of the tracking error signal amplitude that correspond to the allowable-limit vibration value (0.5 gram-cm, for example) of a disc-shape storage medium (CD-ROM and the like) reproducer are burned in for an allowable-limit vibrating disc, for example, Aa for the lowest rotational speed of ×12 speed of the reproducer, Ba for medium ×20 speed, and Ca for the highest speed of ×24 speed. As parameters for Specification B, maximum values of tracking error signal amplitude that correspond to separate allowable-limit vibration values are burned in with 2-byte numerals Ab, Bb, Cc in the same manner as above.

On the other hand, as individual disc reproducers have performance dispersion in the manufacturing process, the maximum value of tracking error that corresponds to each of the standard threshold level parameters at respective rotational speed varies and is measured in a reproducer of Specification A, for example, to be Aa', Ba', Ca': or Ab', Bb', Cb' in the case of Specification B. Table 1 shows an example. In order that a disc reproducer can surely detect a vibrating disc and detect the allowable maximum reproduction speed of the disc reproducer, in the event the maximum value of TE signal voltage that corresponds to the standard threshold level parameter is different, rewriting of the EEPROM data is carried out using the maximum value of the TE signal voltage as the threshold level.

By way of concrete examples, in Table 1, suppose that the designed central TE signal voltage, Ca, of a disc-shape storage medium reproducer based on Specification A at ×24 speed is Ca=1.50 volt. If the TE signal voltage obtained by mounting an allowable-limit disc Dc on a reproducer being manufactured is 1.60 volt, rewriting of the threshold level is not necessary.

TABLE 1

| | Spec A reproducer | | Spec B reproducer | |
|---|---|---|---|---|
| Disc rotational speed | Std threshold level parameter | Measured tracking error | Std threshold level parameter | Measured tracking error |
| X12 speed | Aa | Aa' | Ab | Ab' |
| X20 speed | Ba | Ba' | Bb | Bb' |
| X24 speed | Ca | Ca' | Cb | Cb' |

The reason is because, as the TE signal voltage is greater than the threshold level, a disc having a vibration value greater than that of the allowable-limit disc will be reproduced at a lowered speed thus vibration will not increase.

However, when the TE voltage is 1.45 volt, there may occur a case where the TE signal voltage is 1.50 volt or smaller even when a disc with a larger vibration value than the allowable-limit disc is mounted and reproduced. In such a case, unless the threshold level is rewritten, vibration will increase. By rewriting the threshold level, reproduction at the maximum speed is enabled as close to the allowable vibration limit as possible, and data read-out at a high speed is enabled. When the threshold level is set at 1.20 volt, for example, TE signal voltage of majority of discs will be 1.20 volt or greater, and there will be little possibility of being able to read out data at the maximum speed.

Next, when the vibration value data of an allowable-limit disc Dc at ×20 speed is Ba', judgment is made on the standard threshold level Ba in the same manner.

By correcting dispersions of individual disc reproducers in the manner described above, an accurate discrimination as to whether or not vibration value of a disc in general with an unknown mass eccentricity is within the allowable limit is enabled.

When the change mode is "Yes" under this condition, microprocessor 18M captures the vibration value that is measured to be the maximum value of the TE signal, and changes standard value data Ca burned in EEPROM 51 to threshold level Ca' that is peculiar to the reproducer in question thus accomplishing vibration detection threshold level changing process. Subsequently, when the vibration value data of the allowable limit disc Dc at ×20 speed is Ba' and the change mode is "Yes", a process is carried out to change the standard data Ba to peculiar threshold level Ba' in the same way. Subsequently, if the vibration value data of an allowable-limit disc Db at ×12 speed is Aa' and the change mode is "Yes", a process is carried out in the same way to change the standard data Aa to threshold level Aa' that is peculiar to the reproducer in question.

Further examples of above method of increasing detection accuracy by increasing the number of vibration detection and judgment will be described below.

When data reproduction speeds of a data reproducer are ×10 speed, ×20 speed, ×30 speed, and ×40 speed, by setting vibration detecting speeds as shown in Table 2 and increasing the number of vibration judgment, the maximum reproduction speed of a disc with further smaller vibration value (0.3 gram-cm, for example) can be judged with high accuracy. Furthermore, by providing two threshold levels Ac1, Ac2 for vibration detection, it becomes possible to prevent possibility of a disc with a large vibration value (1 gram-cm, for example) to vibrate to an extent discernible by a user even at ×20 speed, and to prevent abandoning of a situation in which little vibration occurs at ×20 speed with a disc having a small vibration value (0.3 gram-cm, for example), namely, abandoning of possibility of reproduction at a higher speed.

TABLE 2

| | Specification A | | Specification C | | |
| --- | --- | --- | --- | --- | --- |
| | Threshold level | Measured value | Threshold level | Measured value | Estimated threshold level change |
| X12 speed | Aa | As' | Ac1 Ac2 | Ac' | Ac' Ac' + α1 |
| X20 speed | Ba | Ba' | Bc1 Bc2 | Bc' | Bc' Bc' + α2 |
| X24 speed | Ca | Ca' | Cc1 Cc2 | Cc' | Cc' Cc' + α3 |

In summary, reduction in system functionality due to reproduction of a disc with a small vibration value at a low speed can be lessened by reproducing a disc with a large vibration value (Ac'>Ac2) at a low speed, and reproducing a disc with a small vibration value (Ac1<Ac'<Ac2) at a medium speed.

Here, the estimated threshold level change is a change of the value that is judged to be needed when the measured value is for a standard disc, and α1, α2, α3 are values for correction equal to the distance between two threshold levels.

Figure 9:
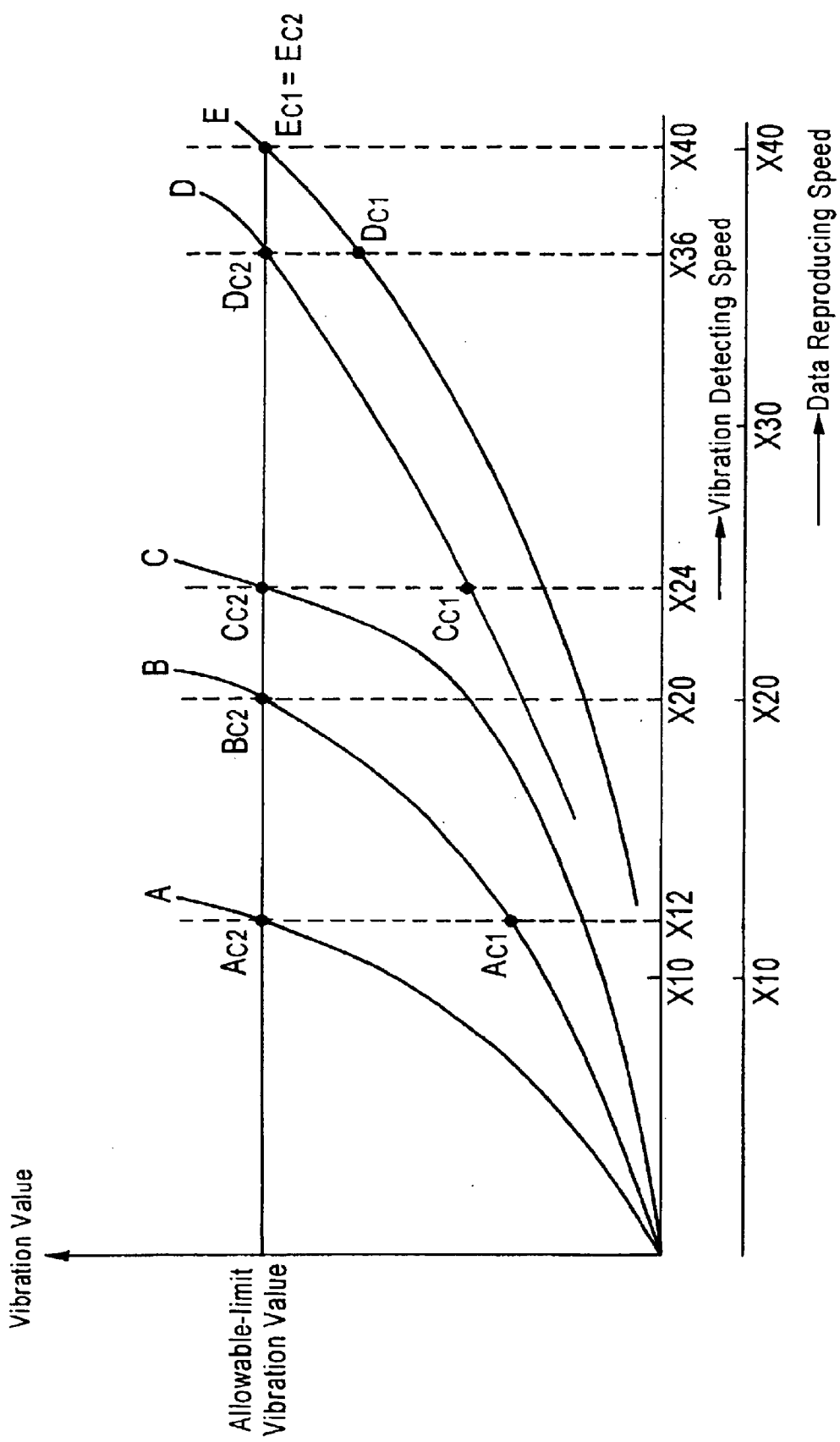
FIG. 9 is a graph showing relationship between vibration detecting speed and allowable-limit vibration value.

A further detailed description will now be given below in reference to FIG. 9. FIG. 9 shows relationship between speed of vibration detection and vibration value produced. Curves A, B, C, D, E represent speed vs. vibration value characteristic for each of standard discs that generates allowable-limit vibration value at the speed of vibration detection. As shown in the figure, threshold levels can be set as threshold levels Ac1/Ac2 for ×12 speed, threshold levels Bc1/Bc2 for ×20 speed, threshold levels Cc1/Cc2 for ×24 speed, . . . , and threshold levels Ec1/Ec2 for ×40 speed.

These cases include cases where the data reproduction speed and vibration detecting speed are different. For example, when vibration detection of a disc with an unknown vibration value is started, vibration is detected at ×12 speed that is the lowest of the vibration detecting speeds. If vibration value Ac' satisfies Ac'>Ac2, the disc is judged to be a vibrating disc, and the data reproduction speed is determined to be ×10 speed. If A1<Ac'<Ac2, ×10 speed is determined to be the data reproduction speed as this speed is not a data reproduction speed.

If Ac'<Ac1, judgment is made that data reproduction at a higher speed is possible, and vibration measurement is carried out by increasing the reproduction speed to ×20 speed which is the next vibration detecting speed. The relationship between threshold levels Bc1, Bc2 at this speed and the obtained vibration value Bc''is then judged. This case being data reproduction speed, the maximum data reproduction speed will be ×10 speed if Bc'>Bc2 and ×20 speed if Bc1<Bc'<Bc2. Also, if Bc'<Bc1, judgment is made that maximum data reproduction speed for data reproduction exists on even higher speed side, vibration detection is carried out by increasing the reproduction speed to ×24 speed, and the relationship with threshold levels Cc1, Cc2 is judged. When maximum speed of ×40 speed is reached by successively repeating this process, detected vibration value Ec' (of a disc with a small vibration value) is compared with threshold level Ec1 (≈Ec2) and judged in the same manner as above.

As ×40 speed is the maximum speed for data reproduction in this case, if Ec'<Ec1, then Ec1<Ec1'<Ec2, and ×40 speed is judged to be the maximum data reproduction speed. If Ec'>Ec2, then ×30 speed is judged to be the maximum data reproduction speed and vibration detection is completed.

Figure 7:
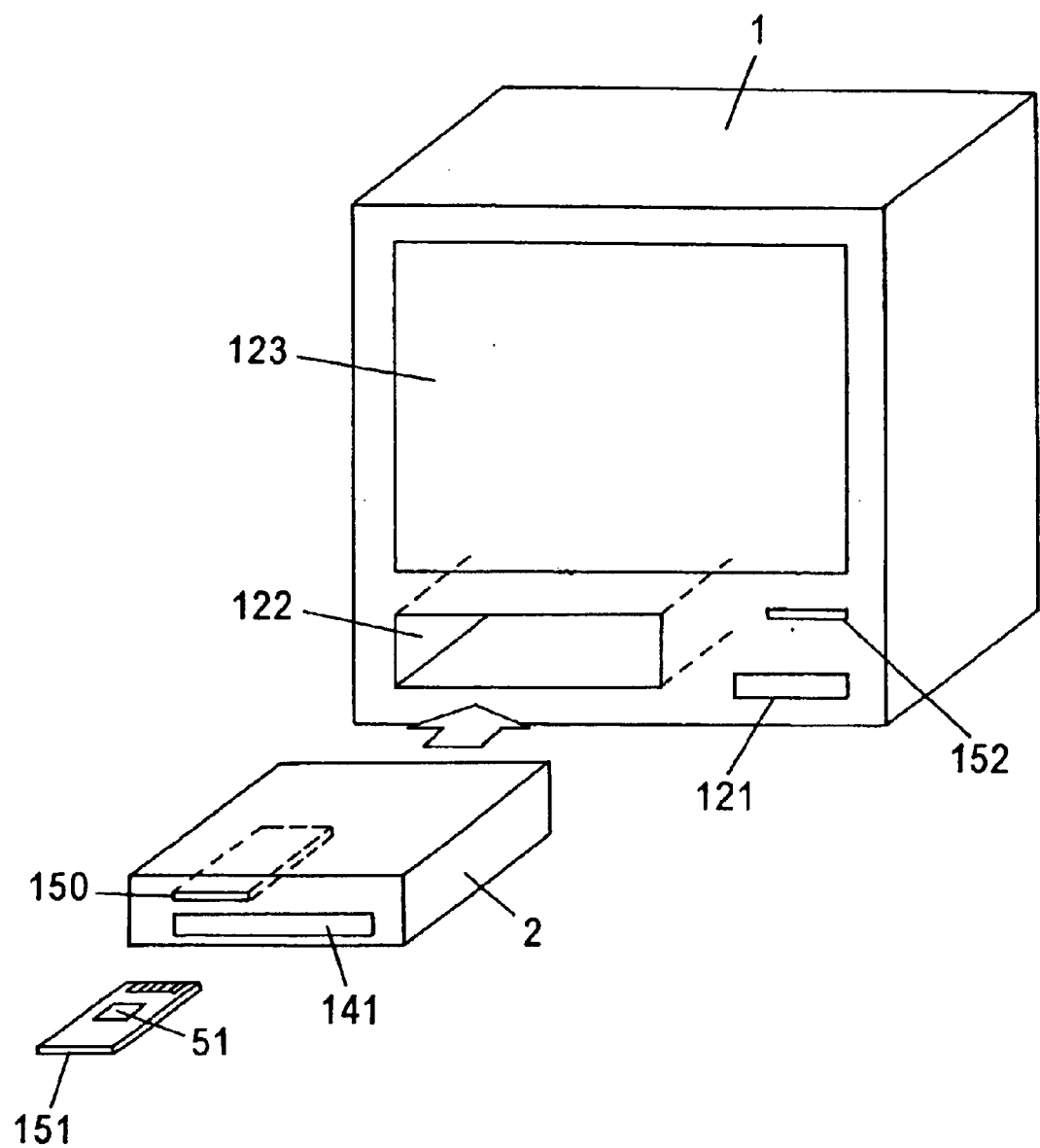
FIG. 7 is an external view of a reproducer in which EEPROM is incorporated in an IC card.

Next, EEPROM 51 for storing threshold levels will be discussed. One possible embodiment is to incorporate EEPROM 51 in the so-called IC card 151 so that IC card 151 can be inserted into slot 150 provided on a housing of a disc reproducer 2 as illustrated in FIG. 7. In this case, as a different threshold level is stored in EEPROM 51 for each different specification, it gives convenience in manufacturing mixed models on a single production line. The same advantage may be obtained by providing slot 152 for the IC card on a housing of host computer 1. In this case, needless to say, threshold level and vibration value are compared after reproducer 2 has been inserted into reproducer slot 122 of host computer 1, threshold level is set based on the measured result, and reproducer 2 is kept inserted in host computer 1 once setting has been made. In FIG. 7, numeral 121 is a slot for a floppy disc and numeral 123 is a display of host computer 1.

As has been described above, the present exemplary embodiment has the following advantages.

(1) As the amount of eccentricity is measured and rotational speed of disc 4 is determined prior to data reproduction, occurrence of a data read-out error due to a tracking error that occurs after start of data reproduction can be avoided, and overall reduction in data reproduction speed can be avoided. Even if reproduction is made at the maximum speed (first speed) from the beginning, if an error occurs, the time required for reproduction will become long in the end due to retrials and the like. Conversely, in this exemplary embodiment, the maximum speed at which stable data reproduction is possible can always be determined at below the vibration value that is acceptable by a reproducer by carrying out detection of vibration value on the low speed side using a plurality of threshold levels that have been set. As a result, data reproduction is enabled without giving unpleasant feeling to a user, occurrence of error is reduced, and required reproduction time is made shorter than when an error is occurring.

(2) In this exemplary embodiment, a description is made on detection of vibration of a reproducer due to a disc with mass eccentricity as the amount of eccentricity of a track in terms of a tracking servo error signal. However, similar concept can be applied to a system in which vibration is detected in the form of a signal that crosses the track obtained by making the tracking servo system open. It is also applicable to a system in which vibration of a reproducer is detected with an acceleration sensor.

(3) The advantages of (1) and (2) above also apply to a recording device of
a recordable disc-shape storage medium in which allowable vibration of the device is severer, and further enhanced advantage will be exhibited.

(4) In the case of a low quality disc, as rotational speed is not made high,
vibration of disc 4 and a disc reproducer as a whole is suppressed, and influence of vibration on other devices (such as HDD) is lessened. Also, as vibration is reduced, unpleasant feeling to a user is reduced.

Industrial Applicability

By setting an amount of allowable vibration of a disc-shape storage medium reproducer-recorder by using a disc having a known mass eccentricity, data reproduction is enabled by rotating a disc at the maximum speed that can be set while keeping the vibration value produced within an allowable limit when discs with different mass eccentricity are reproduced or recorded.

List of Reference Numerals

1. Host personal computer
2. Disc-shape storage medium reproducer
3. Bus line
4. Disc recording medium (CD-ROM and the like)
5M. Spindle motor
5D. Spindle driver
5F. FG signal
5S. One rotation periodic signal
6. Optical pickup
7. Pickup drive
8. Waveform-shaping circuit
9. Servo processor
10. Error correction/interface circuit
11. System control block
12. Spindle servo block
13. Pickup servo block
13T. Tracking servo block
14. Synchronization detection and demodulation circuit
15. Interface for microprocessor
16. 16. Error detection and correction circuit
17. Interface circuit
18M. Microprocessor18P. Program ROM
18R. Work RAM
18C. Clock generator
19. Spindle
20. Center hole
30, 33. Phase compensation and drive circuit
31. TE detecting circuit
32. Focus error detecting circuit
34. Data detecting circuit
36. TE signal
36T. Digitalized TE signal
41. Track
42. Spot
51. EEPROM
52. Writing/reading control means
61. Laser beam
62. Diffraction grating
63. Cylindrical lens
64. Reflected light beam
65. Beam splitter
66. Collimater lens
67. ¼ wavelength plate
68T. Tracking actuator
68L. Objective lens
69, 69F, 69B. Optical detector
90. Vibration value detecting and judging means
91. A/D converter
92. Maximum-value detecting means
93. Frequency divider
94. Comparing means
95. Threshold level generating means
96. Mode switching signal generating means
97. Speed command data generating means
98. Line
121. Floppy disc slot
122. Reproducer receiving slot
123. Display
141, 150, 152. Receiving slot
151. IC card.

What is claimed is:

1. A disc-shape storage medium reproducer comprising:
disc rotating means for rotating a storage medium disc having data recorded on a spiral or concentric tracks and having a center hole, said disc rotating means including a spindle to be inserted into said center hole, and being formed in a manner such that said disc can be detachably inserted and that the rotational speed can be varied;
a signal converter for reading out said data from said disc;
moving means for moving said signal converter in radial direction of said disc; wherein
values relating to vibration values that are measured with vibration value measuring means by mounting a disc (allowable-limit disc) with a known mass eccentricity into said reproducer and rotating said allowable-limit disc are stored in storage means inside said reproducer as a threshold level that indicates the allowable limit.

2. The disc-shape storage medium reproducer of claim 1, wherein stored content of said storage medium disc is rewritable.

3. The disc-shape storage medium reproducer of claim 1, wherein reading out and rewriting of the content of said storage medium disc are possible.

4. The disc-shape storage medium reproducer of claim 1, wherein a storage medium disc is mounted on a disc-shape storage medium reproducer comprising rotation control means which is settable to n kinds of data reproducing speeds and at least n kinds of vibration detecting speeds including said reproducing speeds, the vibration value of said disc is measured by rotating said disc at a vibration detecting speed lower than the maximum reproducing speed, and the maximum reproducing speed at which data is reproducible is determined based on judgment on at least n pieces of threshold levels that have been set based on the allowable-limit vibration value that is preset in said reproducer.

5. The disc-shape storage medium reproducer of claim 1, wherein a plurality of threshold levels corresponding to a plurality of allowable-limit discs is stored in a nonvolatile memory.

6. The disc-shape storage medium reproducer of claim 1, wherein a nonvolatile memory storing threshold levels is incorporated in an IC card (memory card) and said memory card is detachable from outside said reproducer.

7. The disc-shape storage medium reproducer of claim 2, wherein a storage medium disc is mounted on a disc-shape storage medium reproducer comprising rotation control means which is settable to n kinds of data reproducing speeds and at least n kinds of vibration detecting speeds including said reproducing speeds, the vibration value of said disc is measured by rotating said disc at a vibration detecting speed lower than the maximum reproducing speed, and the maximum reproducing speed at which data is reproducible is determined based on judgment on at least n pieces of threshold levels that have been set based on the allowable-limit vibration value that is preset in said reproducer.

8. The disc-shape storage medium reproducer of claim 2, wherein a plurality of threshold levels corresponding to a plurality of allowable-limit discs is stored in a nonvolatile memory.

9. The disc-shape storage medium reproducer of claim 2, wherein a nonvolatile memory for storing threshold levels is incorporated in an IC card (memory card) and said memory card is detachable from outside said reproducer.

10. The disc-shape storage medium reproducer of claim 3, wherein a storage medium disc is mounted on a disc-shape storage medium reproducer comprising rotation control means which is settable to n kinds of data reproducing speeds and at least n kinds of vibration detecting speeds including said reproducing speeds, the vibration value of said disc is measured by rotating said disc at a vibration detecting speed lower than the maximum reproducing speed, and the maximum reproducing speed at which data is reproducible is determined based on judgment on at least n pieces of threshold levels that have been set based on the allowable-limit vibration value that is preset in said reproducer.

11. The disc-shape storage medium reproducer of claim 3, wherein a plurality of threshold levels corresponding to a plurality of allowable-limit discs is stored in a nonvolatile memory.

12. The disc-shape storage medium reproducer of claim 3, wherein a nonvolatile memory for storing threshold levels is incorporated in an IC card (memory card) and said memory card is detachable from outside said reproducer.

13. The disc-shape storage medium reproducer of claim 4, wherein a plurality of threshold levels corresponding to a plurality of allowable-limit discs is stored in a nonvolatile memory.

14. The disc-shape storage medium reproducer of claim 4, wherein a nonvolatile memory for storing threshold levels is incorporated in an IC card (memory card) and said memory card is detachable from outside said reproducer.

15. A disc-shape storage medium reproducer comprising:
disc rotating means for rotating a storage medium disc having data recorded on spiral or concentric tracks and having a center hole, said disc rotating means including a spindle to be inserted into said center hole and being formed in a manner such that said disc can be detachably inserted and that the rotational speed can be varied;

a signal converter for reading out said data from said disc;

moving means for moving said signal converter in the radial direction of said disc;

vibration value measuring means for measuring vibration obtained by rotating said disc;

storage means for storing data relating to allowable-limit vibration value as threshold level;

comparing means for comparing said threshold level with the data relating to the vibration value measured by said vibration value measuring means; and judging means for judging whether or not said data relating to the measured vibration value is within an allowable range set by said threshold level; wherein the data relating to said allowable vibration-limit value is stored in advance in said storage means as a threshold level for criterion, said threshold level for criterion is compared by said comparing means with the data relating to the vibration value obtained by rotating said allowable-limit disc using a disc with a known mass eccentricity as an allowable-limit disc, and when judgment is made by said judging means that the vibration value is outside the allowable range, said threshold for criterion is changed.

16. The disc-shape storage medium reproducer of claim 15, wherein the stored content of said storage medium disc is rewritable.

17. The disc-shape storage medium reproducer of claim 15, wherein reading out and rewriting of the stored content of said storage medium disc are possible.

18. The disc-shape storage medium reproducer of claim 15, wherein a storage medium disc is mounted on a disc-shape storage medium reproducer comprising rotation control means which is settable to n kinds of data reproducing speeds and at least n kinds of vibration detecting speeds including said reproducing speeds, the vibration value of said disc is measured by rotating said disc at a vibration detecting speed lower than the maximum reproducing speed, and the maximum reproducing speed at which data is reproducible is determined based on judgment on at least n pieces of threshold levels that have been set based on the allowable-limit vibration value preset in said reproducer.

19. The disc-shape storage medium reproducer of claim 15, wherein a plurality of threshold levels corresponding to a plurality of allowable-limit discs is stored in a nonvolatile memory.

20. The disc-shape storage medium reproducer of claim 15, wherein a nonvolatile memory for storing threshold levels is incorporated in an IC card (memory card) and said memory card is detachable from outside said reproducer.

* * * * *